United States Patent [19]

York

[11] 3,729,904
[45] May 1, 1973

[54] GAS-LIQUID SEPARATOR

[76] Inventor: Jesse Louis York, 3893 West Liberty Road, Ann Arbor, Mich. 48103

[22] Filed: June 16, 1969

[21] Appl. No.: 833,310

[52] U.S. Cl. .................................................55/457
[51] Int. Cl. ............................................B01d 45/12
[58] Field of Search.....................55/337, 447, 448, 55/456, 457, 459, 452, 435, 355, 238, 521, 293; 209/144

[56] References Cited

UNITED STATES PATENTS

| | | | |
|---|---|---|---|
| 2,425,588 | 8/1947 | Alexander | 55/447 |
| 2,961,064 | 11/1960 | Fisher | 55/457 |
| 940,827 | 11/1909 | Sheward | 209/144 |
| 1,888,603 | 11/1932 | Mauthe | 55/238 |
| 2,999,563 | 9/1961 | Wehn et al. | 55/293 |
| 3,251,176 | 5/1966 | Gleason | 55/355 |
| 3,448,862 | 6/1969 | Kudlaty | 55/521 X |
| 2,511,967 | 6/1950 | Campbell | 55/458 |
| 3,056,662 | 10/1962 | Ridgway | 55/459 |
| 3,398,513 | 8/1968 | Thompson | 55/447 |

FOREIGN PATENTS OR APPLICATIONS

| | | | |
|---|---|---|---|
| 574,844 | 4/1933 | Germany | 55/337 |

*Primary Examiner*—Bernard Nozick
*Attorney*—John G. Batchelder

[57] ABSTRACT

A centrifugal gas-liquid separator having a boundary layer control screen for inhibiting re-entrainment of separated liquid with the gas stream.

5 Claims, 5 Drawing Figures

Patented May 1, 1973

INVENTOR.
JESSE LOUIS YORK.
BY
SETTLE, BATCHELDER & OLTMAN.
ATT'YS.

INVENTOR.
JESSE LOUIS YORK.
BY
SETTLE, BATCHELDER & OLTMAN.
ATT'YS.

GAS-LIQUID SEPARATOR

SUMMARY OF THE INVENTION

The present invention has utility in many types of gas-liquid separators in which centrifugal force is relied upon to separate the liquid from the gas. It involves the employment of a wire mesh screen concentrically mounted in uniformly spaced relationship to the wall of the separator chamber which permits substantially free flow of centrifuged liquid droplets to the chamber wall while at the same time providing a sharp velocity gradient in the rotating gas stream at the screen surface. While the screen does not interfere or prevent gas from contacting the separated liquid, it does effectively separate the liquid from the actively flowing portion of the gas stream so that re-entrainment of the liquid droplets with gas in the main flow path is inhibited.

Other objects and features of the invention will become apparent by reference to the following specification and to the drawings.

IN THE DRAWINGS

Figure 1:
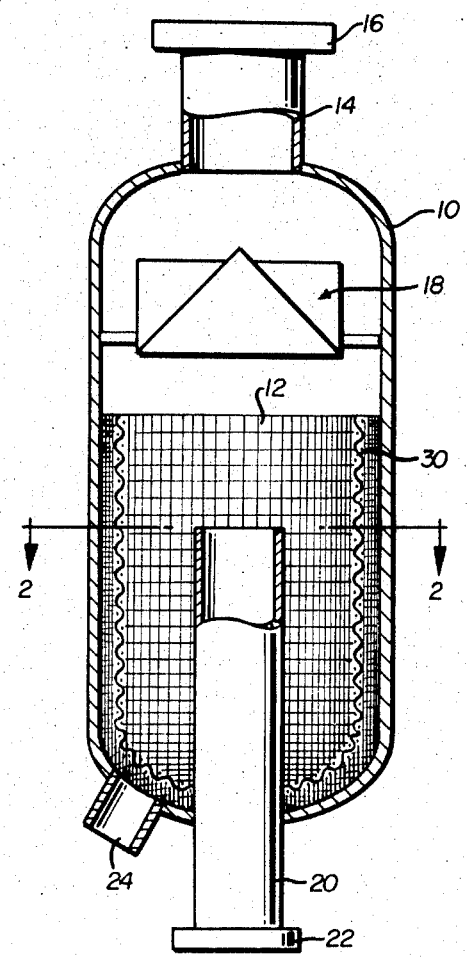
FIG. 1 is a longitudinal cross-sectional view of one exemplary form of separator embodying the invention.
Figure 2:
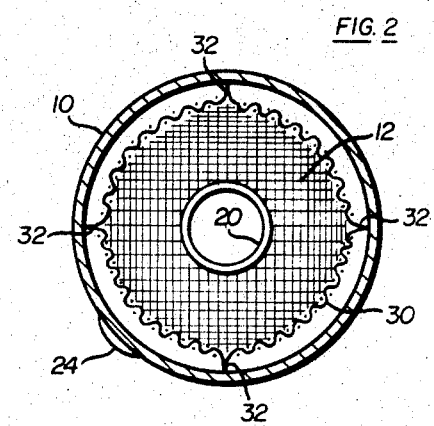
FIG. 2 is a transverse cross-sectional view taken on line 2—2 of FIG. 1.
Figure 4:
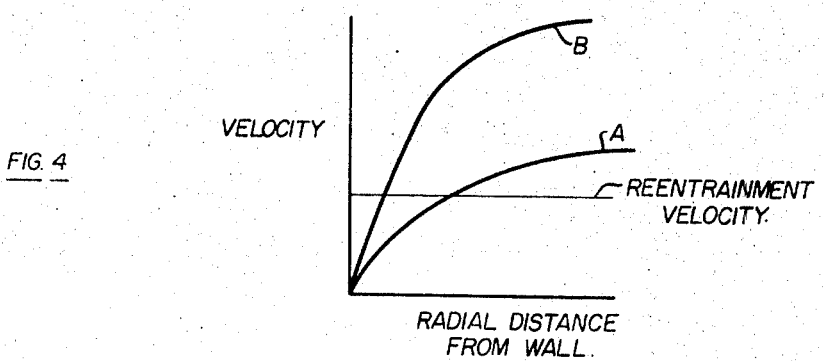
Figure 5:
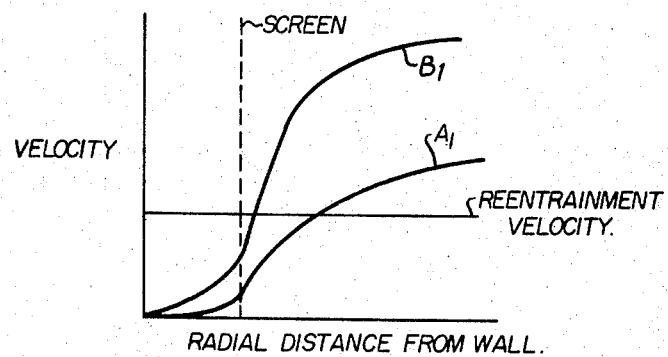

FIG. 4 is a set of generalized curves showing the relationship between the gas velocity and the radial distance inwardly from the separation chamber wall for a prior art separator of the type shown in FIG. 1; and FIG. 5 is a set of generalized curves showing the relationship between gas velocity and radial distance inwardly for the separator wall corresponding to FIG. 4, but indicating the effect of the present invention.

In the drawings, the invention is disclosed in use with a gas-liquid separator of more or less conventional construction, which is of a type frequently employed in pipe systems to separate liquid from gas passing through the pipe system. A typical environment in which a separator of the type shown in the drawings might be employed is an air compressor in which the separator would be employed to separate condensed liquid from the air. The separator of FIG. 1 includes a hollow annular body 10 whose interior constitutes the separation chamber 12. One end of the body is formed with an inlet pipe 14 having a suitable flange fitting 16 for connecting the separator to a mating pipe fitting. A stationary vane assembly designated generally 18 is co-axially mounted within the interior of the body 10 adjacent the inlet to deflect the incoming flow of a gas-liquid mixture into a helical path. The outlet of chamber 12 is defined by an open-ended pipe 20 extending co-axially of chamber 12 and projecting a substantial distance axially into the chamber. Like the inlet pipe 14, the exposed end of pipe 20 is provided with a suitable flange or fitting 22. Outlet pipe 20 provides an outlet for the gaseous component of a gas-liquid mixture separated by the assembly, the liquid component of the incoming mixture being centrifuged, by the whirling action imparted to the mixture by the vane assembly 18, to the wall of separation chamber 12. A liquid drain connection 24 is provided near the bottom of the separator as illustrated in FIG. 1, the location of drain 24 in the specific example disclosed being due to the fact that this particular type of separator may be mounted in either a horizontal or a vertical position in use.

The separator, as described thus far, is conventional. In operation, the fluid to be separated is fed into inlet 14 and, as the fluid flows past vane assembly 18, the vanes deflect the fluid into a swirling helical flow pattern. The liquid components of the fluid, being heavier than the gas, are driven radially outwardly by centrifugal flow to the interior wall of the chamber, while the gas is withdrawn through the centrally located outlet conduit 20.

At relatively low flow rates, such separators operate at relatively high efficiencies with 95 percent or more of the entrained liquid being separated from the gas. As the flow rates through the separator increase, the efficiency remains substantially constant until a limiting flow rate is reached, at which the efficiency drops off sharply. Most separators of this type are guaranteed by the manufacturer to maintain an efficiency of at least 95 percent up to their so-called "rated flow capacity." In practice, the "rated flow capacity" is frequently determined by finding the flow rate at which the efficiency drops below 95 percent. The efficiency versus flow rate curve of this particular type of separator drops off very sharply and may, for example, find the efficiency dropping to less than 50 percent at 110 percent of the rated flow capacity.

The reduction in efficiency is due primarily to re-entrainment of separated liquid back into the gas stream. At higher flow rates, the velocity of the gas increases, thus exerting a more violent effect of the gas on the liquid at the interface between the gas and the separated liquid.

Figure 3:
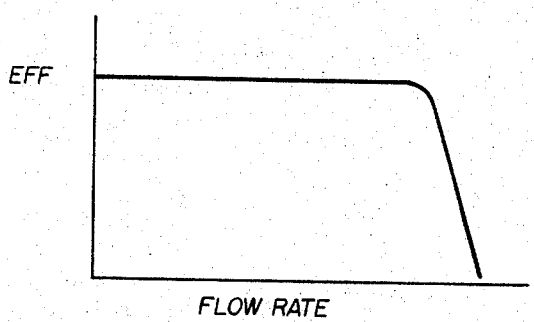
FIG. 3 is a generalized curve of efficiency versus flow rate for a separator of the type shown in FIGS. 1 and 2.

A typical efficiency versus flow rate curve for a separator of this type is shown in FIG. 3.

The reason for the sharp drop-off of efficiency as shown in the curve of FIG. 3 becomes apparent from an examination of the curves shown in FIG. 4 in which the velocity of gas is plotted as a function of the radial distance from the wall. Neglecting, for the moment, the film of liquid formed upon the wall by operation of the separator, the gas velocity at the stationary wall must be zero, and increases as the distance inwardly from the wall of the separator increases. In FIG. 4, two curves A and B are shown, curve A representing a velocity-distance relationship for a given flow rate, while curve B indicates the same relationship at a higher flow rate. A horizontal line designated "re-entrainment velocity" has been applied to a graph of FIG. 4 to represent a velocity at which re-entrainment of separated liquid will occur at the gas-liquid interface. This may be defined as the gas velocity at the gas-liquid interface at which the frictional effect of the moving gas stream overcomes the surface tension of the liquid. From a comparison of the intersection of the re-entrainment velocity line with curves A and B in FIG. 4, it is apparent that as the flow rate increases, the distance from the wall at which the re-entrainment velocity is reached decreases. Once the re-entrainment velocity is reached at the gas-liquid interface, the surface tension of the liquid film on the wall is broken and the liquid droplets are substantially unrestrained and tend to follow the gas stream. Since the gas ultimately must exit from the separation chamber, the separation efficiency drops off rapidly once re-entrainment begins to occur.

In accordance with the present invention, re-entrainment is inhibited by mounting within the separation chamber a perforate annular liner conformed in shape to and concentrically supported in uniformly spaced relationship to the interior wall of the separation chamber. The liner preferably takes the form of a wire mesh screen 30 formed with a plurality of circumferentially spaced axially extending pleats 32 which project radially outwardly from a main body of screen 30 to engage the chamber wall. The screen 30 may be secured in position as by tack welding the pleats 32 to the chamber wall. The screen should be mounted in a manner such that its mounting does not block or dam circumferential flow of the liquid film.

For reasons which will be discussed below, the spacing between the wall and the screen at points other than along the ribs should be approximately one-quarter of an inch, and the openings in the screen should constitute about 50 percent of the total area of the screen for an air-water separation. The openings should be uniformly distributed over the entire surface of the screen within a range of 3 to 20 openings per inch. The optimum number of openings per inch will vary in accordance with the physical properties of the liquid component being separated. In general, 10 to 12 openings per inch are most effective for water separation, while a smaller number of openings per inch are more effective where more viscous liquids are involved.

The radial spacing of the screen from the chamber wall is dependent primarily on the characteristics of the fluid mixture being separated, and is substantially independent of the physical dimensions of the separator and the flow rate. Primarily, the spacing is a function of film thickness, which in turn is determined to a large extent by the viscosity of the liquid and the wetting characteristics of the particular liquid on the particular wall surface. Experience has shown that the optimum screen spacing falls somewhere within the range of between three to 12 times the film thickness of the liquid on the wall. The breadth of this range is due to the fact that waves are formed in the liquid film on the wall in many instances so that the film thickness can vary over an appreciable range in a generally unpredictable manner. In general, the film thickness where the liquid being separated is water will fall somewhere within the range of one thirty-second to one-sixteenth of an inch, and hence the optimum screen spacing — i.e. distance from the chamber wall — is approximately one-quarter of an inch for an air-water separating operation. The 50 percent ratio of area of the screen openings to total area of the screen is selected to prevent accretion of liquid on the screen surface and to provide openings of sufficient size to prevent the liquid from bridging, and hence clogging the screen openings.

The function of the screen is to exert a frictional drag on the gas stream so that the point at which the stream reaches re-entrainment velocity is, in effect, shifted away from the wall. In FIG. 5, the effect of the presence of the screen on the gas velocity pattern is presented graphically.

In FIG. 5, as in FIG. 4, gas velocity as a function of distance from the wall is presented in two curves, A1 and B1, respectively representing the velocity relationship for a relatively low (A1) and a relatively high (B1) flow rate. Again as in FIG. 4, a horizontal line representing re-entrainment velocity is shown, and a vertical line representing the spacing of the screen at a fixed radial distance from the wall is likewise shown.

Comparing FIG. 4 with FIG. 5, it will be seen that the presence of the screen, in effect, shifts the velocity curves of FIG. 4 to the right so that the point at which a given velocity is reached is spaced inwardly a greater distance from the chamber wall in the presence of the screen. Because of the fact that the screen is open for at least 50 percent of its total area, the gas velocity at the surface of the screen is not reduced to zero, but is substantially reduced from what it would be if the screen were not present.

As the ratio of the area of the screen openings to total screen area increases, the effectiveness of the screen in reducing the gas velocity at the screen surface becomes less and less — i.e. the point at which curves A1 and B1 intersect the line representative of the screen would rise in the graphs of FIG. 5.

As the ratio of the area of the openings to total screen area decreases, the screen begins to function more and more like the chamber wall. Thus, while a ratio of 50 percent for the area of screen openings to total screen area represents an approximate optimum, generally satisfactory conditions can be achieved with the total area of the openings falling within a range of from 40 to 50 percent of the total screen area.

The optimum spacing of one-quarter of an inch for an air-water separation again represents an approximate optimum spacing. The presence of the screen at substantially any spacing from the wall will have the effect of shifting the drop-off point of the curve of FIG. 3 to higher flow rates than can be achieved without the screen.

A separator with the screen lying flat against the chamber wall will maintain maximum separating efficiency at slightly higher flow rates than could be achieved without any screen at all, because the screen in effect functions as a roughened wall surface and the frictional drag effects on the gas stream are increased. As the spacing of the screen from the chamber wall increases beyond the thickness of the liquid film on the wall, the flow rate at which maximum efficiency is maintained increases drastically — to as much as two to three times the maximum flow at which maximum efficiency can be maintained in the absence of the screen. As the screen spacing continues to increase, increased maximum flow rates can be achieved in air-water environments until the spacing reaches approximately one-quarter of an inch. As the screen spacing increase beyond one-quarter of an inch, the maximum possible flow rate at maximum efficiency begins to fall off at a relatively slow rate. This is believed to be due to a combination of two effects — first, when the screen is relatively close to the wall, the frictional drag exerted by the screen on the gas stream is augmented to some extent by that exerted by the wall. At spacings beyond one-quarter of an inch, the assistance of the wall in exerting a frictional drag is lost, while at the same time the screen is moving into a region of increasing gas velocity. At extreme spacings from the chamber wall, the drag effect of the screen on the gas stream begins to have an adverse effect on the gas flow pattern.

The screen does not function as a barrier between the separated liquid and the gas stream, but instead functions to establish a velocity gradient in the gas stream which prevents the gas stream from achieving re-entrainment velocity at the gas-liquid interface until exceedingly high flow rates are reached.

In the separator, the screen should be located to overlie all of the chamber wall surfaces to which liquid will be impelled and exposed to high gas velocities during normal operation of the separator. Thus, in the particular form of separator disclosed in the drawings, the screen overlies the interior wall of the chamber from a point slightly below the vane assembly 18 and extends along the bottom wall of the chamber into abutment with the exterior of the outlet conduit 20.

From the foregoing, it is believed apparent that the invention has general utility in gas-liquid separators of the centrifugal type and that the in-line separator discussed above is but one of several conventional centrifugal gas-liquid separator configurations to which the invention is applicable.

I claim:

1. In a gas-liquid separator of the centrifugal type including wall means defining an annular separation chamber defined in part by an annular wall, inlet means for introducing a gas-liquid mixture into one end of the annular separation chamber and means adjacent said one end of said separation chamber providing axially of said chamber a helical flow to the mixture to centrifugally impel the liquid component of the mixture to the annular chamber wall to form a liquid film thereon, outlet means at the other end of said chamber adjacent said annular wall for withdrawing liquid, and gas outlet means at the said other end of said chamber coaxial of the annular wall for withdrawing gas from said chamber;

the improvement comprising velocity reducing means in said chamber for retarding the velocity of flow of the mixture in an annular region adjacent to and extending radially inwardly from the chamber wall, said velocity reducing means comprising annular screen means adjacent to and corresponding to the annular wall concentric with and spaced radially inwardly therefrom extending from adjacent the means providing helical flow to substantially the other end of the chamber defining the redial inner boundary of said annular region, and screen means having a plurality of openings therethrough distributed uniformly over its surface, the total area of said openings constituting between approximately 40 and 60 percent of the total surface area of said screen means whereby the velocity of flow of the gaseous component of the mixture within said annular region is maintained at a velocity substantially less than the velocity of the mixture at regions radially inwardly of the screen means, said screen means including support means extending radially across said annular region, means connecting the support means to the annular wall to support said screen means, said support means having openings therethrough to accommodate rotary flow of said mixture within said annular region.

2. In a gas-liquid separator as defined in 1; the improvement wherein said screen means comprises a wire mesh screen having axially extending pleats projecting radially outwardly.

3. In a gas-liquid separator as defined in claim 1; the improvement wherein said liquid film is of an approximate radial thickness T, and the radial spacing between said annular wall and said screen means is equal to from between 3T and 12T.

4. In a gas-liquid separator as defined in claim 1 wherein said mixture is an air-water mixture; the improvement wherein the radial spacing between said annular wall and said screen means is approximately one-quarter inch.

5. In a separator unit of the centrifugal type wherein moving gas having entrained liquid therein is introduced through an inlet at one end of a confined generally cylindrical chamber having means for inducing a swirling flow of the gas about the longitudinal axis of the chamber and a gas outlet substantially concentric with said chamber, and wherein entrained liquid is separated against the walls of said chamber and removed through a liquid outlet at the end of the chamber remote from the inlet and spaced from the gas outlet; that improvement which comprises an annular perforate sheet baffle positioned in concentric inwardly spaced relationship to the walls of the chamber and having a shape corresponding to the shape of the chamber walls, said sheet baffle extending axially from an upstream end spaced down stream of said inlet substantially to the end of said chamber remote from said inlet, and support means extending radially from said baffle to the walls of said chamber to locate said sheet baffle in uniformly spaced relation to said chamber walls, said support means extending axially of said baffle and having openings therethrough accommodating circumferential flow of separated liquid along the chamber walls.

* * * * *